United States Patent [19]

Feamster et al.

[11] Patent Number: 4,850,245

[45] Date of Patent: Jul. 25, 1989

[54] BICYCLE CRANK AND PEDAL STRUCTURE

[76] Inventors: Nicholas G. Feamster; Robert S. Feamster, both of 230 Park Ln., Atherton, Calif. 95025

[21] Appl. No.: 64,155

[22] Filed: Jun. 19, 1987

[51] Int. Cl.⁴ .............................................. G05G 1/14
[52] U.S. Cl. ..................................... 74/594.1; 74/600
[58] Field of Search ................ 74/594.1, 594.7, 594.4, 74/600, 546, 544, 562, 594.3, 522, 525; 272/73, DIG. 4; 280/259; 301/2.5; 403/109, 378, 104

[56] References Cited

U.S. PATENT DOCUMENTS

| | | | |
|---|---|---|---|
| 524,522 | 8/1894 | Bourne | 74/546 |
| 610,157 | 8/1898 | Campbell | 74/594.1 X |
| 628,173 | 7/1899 | Young | 74/594.1 |
| 1,213,825 | 1/1917 | Bloom | 74/562 |
| 2,749,771 | 6/1956 | Pearl | 74/562 X |
| 3,922,929 | 12/1975 | Marchello | 74/594.1 X |
| 4,019,230 | 4/1977 | Pollard | 280/259 X |

FOREIGN PATENT DOCUMENTS

| | | | |
|---|---|---|---|
| 712288 | 10/1941 | Fed. Rep. of Germany | 74/594.1 |
| 876494 | 11/1942 | France | 74/594.1 |
| 365595 | 12/1938 | Italy | 74/594.7 |
| 2603 | of 1893 | United Kingdom | 74/594.1 |
| 14445 | of 1898 | United Kingdom | 280/259 |
| 694226 | 7/1953 | United Kingdom | 74/594.7 |

Primary Examiner—Rodney M. Lindsey
Attorney, Agent, or Firm—Skjerven, Morrill, MacPherson, Franklin and Friel

[57] ABSTRACT

An extender arm for a bicycle crank arm consists of a generally cylindrical structure suitable for being slidably mounted on the crank arm of the bicycle. The distal end of the extender includes an opening for the mounting of a bicycle pedal. The extender arm contains at least one opening in its side for receipt of a bolt or fastener which will extend through the extender arm and into the opening at the end of the crank arm for receipt of a pedal. In one embodiment, the extender also includes a set screw at the proximal end opposite the distal end on which the pedal is mounted for stabilizing the extender arm on the crank arm.

1 Claim, 2 Drawing Sheets

BICYCLE CRANK AND PEDAL STRUCTURE

BACKGROUND OF THE INVENTION

1. Field of the Invention

This invention relates to a bicycle crank and pedal structure and in particular to a bicycle crank capable of being adjusted for use with legs of different lengths.

2. Prior Art

A number of different techniques exist for adjusting the crank of a bicycle. U.S. Pat. Nos. 4,648,287; 4,599,915; 4,446,753; 3,922,929 and 3,888,136 all disclose structures for adjusting the length of a bicycle crank arm. However, each of the structures disclosed in these patents is relatively complicated and sophisticated and therefore expensive. A need exists for a simple, adjustable bicycle crank arm.

SUMMARY OF THE INVENTION

This invention overcomes certain of the disadvantages of the prior art by providing an extender for a bicycle crank arm which is simple and economical yet easy to use. Moreover, the adjustable bicycle crank arm of this invention is adjustable over a range of distances up to the length of the crank arm to which the bicycle pedal is attached.

In accordance with this invention, an adjustable bicycle crank consists of a hollow tubular structure with an opening formed at one end through the tubular walls for receipt of a pedal. The inner surface of the hollow tube is adapted to slide longitudinally along the bicycle crank arm. Holes through the sides of the tubular structure are placed so as to allow the passage of a pin (typically a bolt) through the holes into the opening at the end of the bicycle crank arm in which the bicycle pedal is usually inserted. The tubular extension contains at its distal end an opening, the interior surface of which is, if desired, threaded to receive the mounting bolt of the bicycle pedal. Thus the bicycle pedal can be mounted on the distal end of the extension in the same manner as it is normally mounted on the end of the crank arm.

This invention will be more fully understood in conjunction with the following detailed description taken together with the attached drawings.

DESCRIPTION OF THE DRAWINGS

FIG. 1 shows one embodiment of this invention wherein the adjustable extension 13 of this invention is mounted on a standard bicycle crank arm 11a;

DETAILED DESCRIPTION

While two embodiments of this invention will be shown, other embodiments of this invention will be obvious in view of the following description.

Figure 1:
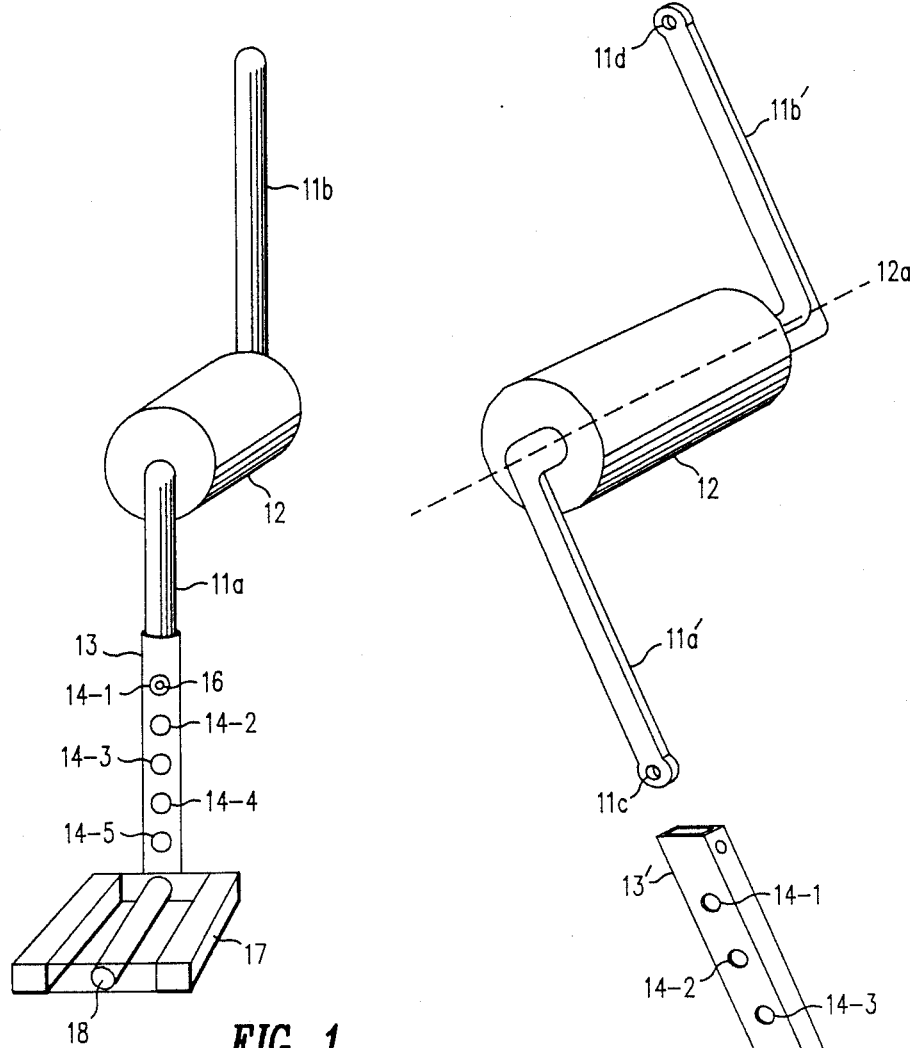

FIG. 1 illustrates the cylindrical bicycle crank arm extender 13 of this invention mounted on a bicycle crank arm 11a. By "tubular" is meant only that the extender 13 is hollow with an interior shape such that extender 13 slides easily over crank arm 11a. The external surface of extender 13 can be any desired shape in cross-section, such as round, square or rectangular. Crank arm 11a is mounted in a well-known manner in a housing 12 containing bearings and lubricant and is symmetrically balanced with crank arm 11b extending from the opposite side of mounting structure 12. Extender 13 contains a plurality of holes 14-1, 14-2, 14-3, 14-4 and 14-5 through which a mounting pin 16 (typically a bolt) can be inserted. Holes 14-i are perpendicular to the plane of rotation of crank arm 11a. Bolt 16 is shown in hole 14-1. Bolt 16 can be threaded on the shank 16b to allow it to be mounted in the threaded opening 11c (FIG. 3) formed in the bottom of crank arm 11a' to receive pedal 17. Should the opening in the bottom of crank arm 11a not be threaded, bolt 16 extends through the opening and is attached to crank arm 11a with nut 16a (FIG. 2b). As shown in FIG. 2b, bolt 16 has nut 16a mounted on its inner end to hold the extender 13 in place on crank arm 11a. By "inner end" is meant the end of bolt 16 facing inward away from the leg of the rider to prevent the pant leg of the rider from snaring on the threaded end of bolt 16. For the same reason, head 16c of bolt 16 is preferably smooth and rounded.

To adjust the crank arm extender 13, bolt 16 is removed from the opening 14-1, the crank arm extender 13 is slid up crank arm 11a until the desired one of openings 14-1, 14-2, 14-3, 14-4 or 14-5 align with the pedal opening (FIG. 3) in the bottom of crank arm 11a. Bolt 16 is then reinserted through the desired opening 14-i into the opening 11c in the bottom of crank arm 11a and the extender is thus mounted firmly on crank arm 11a.

Figure 2A:
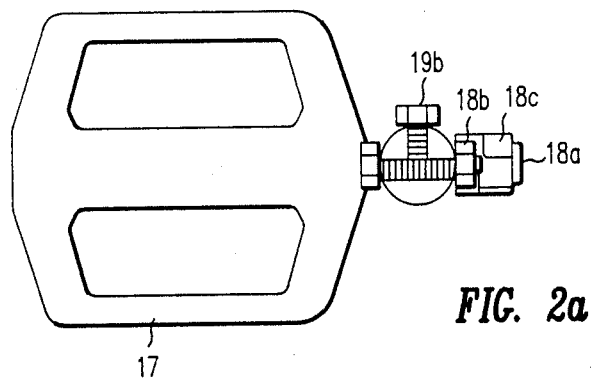
FIGS. 2a, 2b and 2c show the top, front and side views of the adjustable extender 13 of this invention.
Figure 2B:
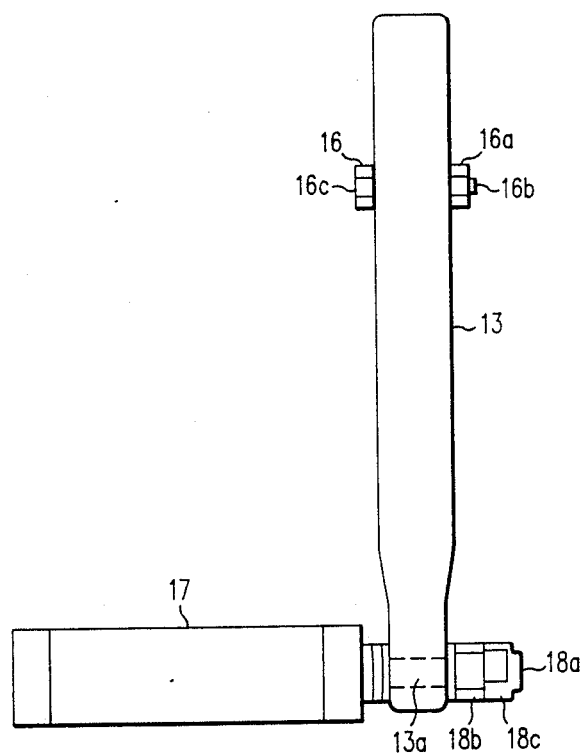
Figure 2C:
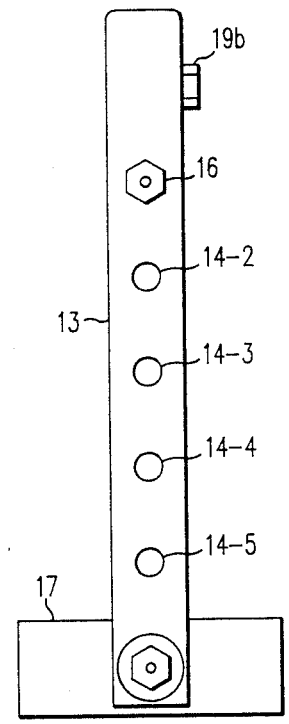

FIG. 2a shows a top view of the extender with pedal 17 mounted in opening 13a (FIG. 2b) in the bottom of extender 13. Opening 13a is adapted to receive end 18a of the pedal mounting bolt 18 (FIG. 1). Nuts 18b and 18c (FIGS. 2a and 2b) are shown in FIG. 2b as holding pedal 17 on extender 13.

Should the opening 13a (shown in dashed line in FIG. 2b) be threaded, then the extension 18a of pedal bolt 18 is also threaded so as to rotatably mount in the opening 13a.

Figure 3:
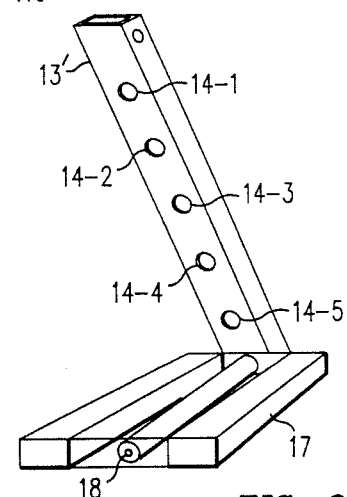
FIG. 3 illustrates an exploded view of the bicycle crank arm extender embodiment 13' of this invention with a pedal 17 mounted at the distal end thereof.

FIG. 3 shows an exploded view of the bicycle crank arm extender 13' of this invention in relation to regular bicycle crank arm 11a'. The cross-section of the interior opening of extender 13' is contoured to match the cross-section of bicycle crank arm 11a'. Openings 11c and 11d are shown at the ends of crank arms 11a' and 11b' for receipt of either the end 18a of pedal mounting bolt 18 or the bolt 16 used to mount the extender arm 13' on crank arm 11a' or 11b'. While not shown, in practice, two extenders 13' will be used at the same time, one on crank arm 11a' and one on crank arm 11b'. Of interest, the two extenders can beadjusted differently to allow a person with two legs of different lengths to ride a bicycle more comfortably.

Figure 4:
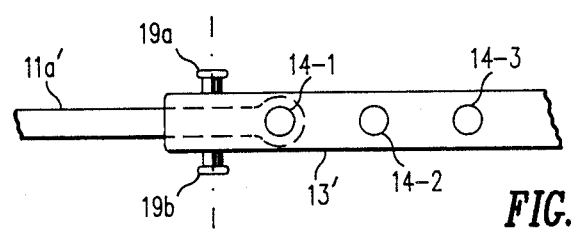
FIG. 4 illustrates an expanded view of one portion of the bicycle crank arm extender 13' of this invention showing stabilizing set screws 19a, 19b mounted in the proximal end of the extender 13'.

As shown in FIG. 4, in an alternative embodiment, extender 13' has set screws 19a and 19b mounted in the proximal end (i.e., the end furthest from the pedal 17) to stabilize and center the extender 13' on crank arm 11a'. The center line along the longitudinal axes of set screws 19a and 19b is in, or parallel to, the plane of rotation of crank arms 11a' and 11b'.

The extender 13 of this invention will fit existing bicycle pedal crank arms such as arms 11a and 11b and is adjustable to fit the length of each leg of the person riding the bicycle. The extender arm 13 of this invention is particularly useful on a children's bicycle because it extends the useful life of the bicycle by a substantial period of time. Naturally the extender arm 13 can only be extended on the crank 11a to a distance which does not allow the pedal 17 to hit the pavement or road when the bicycle is being ridden either straight or around corners. However, the extender arm 13 of this invention does allow the bicycle crank to be adjusted for the particular leg length of the bicycle user. Thus as a child grows, the seat on a bicycle can be adjusted and now, with the extender arm 13 of this invention, the pedals can also be adjusted. As the extender 13 is extended the torque applied to pedal 17 about center line 12a (FIG. 3) through crank housing 12 increases, making the bicycle somewhat easier to ride but increasing the stress loads on crank arms 11a and 11b.

In mounting the extender 13 on the crank arm 11a, the pedal 17 is removed from opening 11c in crank arm 11a, the pedal 17 is fastened to the bottom of extender arm 13 in the opening 13a (FIG. 2b) provided for end 18a of pedal bolt 18, the substantially cylindrical extender arm 13 is then slid over crank arm 11a until the desired opening 14-i lines up with opening 11c. Extender 13 is then fastened to crank arm 11a by inserting bolt 16 through opening 14-i into opening 11c of crank arm 11a. If set screws 19a and 19b are used, these screws are properly tightened down to center and firmly hold extender arm 13 on crank arm 11a.

The above description is meant to be illustrative and not limiting.

What is claimed is:

1. An extender for a bicycle crank arm, said crank arm having an opening for receiving a pedal at its distal end, said extender comprising:
   a tube having an interior opening, the cross-section of which matches in general the cross-section of the bicycle crank arm, wherein the interior opening in said tube is such that said tube is slidable along the longitudinal axis of said bicycle crank arm;
   a plurality of holes formed through the tube spaced along the longitudinal axis of the tube and perpendicular to the plane of rotation of the bicycle crank arm;
   means for extending through a selected one of said plurality of holes in said tube and into the opening at the end of the crank arm thereby to attach said tube to said crank arm;
   said pedal mounted at a distal end of the tube;
   at least one opening in said tube for receipt of a first set screw, said opening being oriented such that the center line of said first set screw is in the plane of rotation of said crank arm; and
   an opening for receipt of a second set screw in said tube opposite said opening for said first set screw.

* * * * *